(12) United States Patent
Salessi (10) Patent No.: US 9,021,189 B2
(45) Date of Patent: *Apr. 28, 2015

(54) SYSTEM AND METHOD FOR PERFORMING EFFICIENT PROCESSING OF DATA STORED IN A STORAGE NODE

(71) Applicant: NXGN Data, Inc., Irvine, CA (US)

(72) Inventor: Nader Salessi, Irvine, CA (US)

(73) Assignee: NXGN Data, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/950,047

(22) Filed: Jul. 24, 2013

(65) Prior Publication Data

US 2015/0032938 A1    Jan. 29, 2015

(51) Int. Cl.
| | |
|---|---|
| G06F 12/00 | (2006.01) |
| G06F 13/00 | (2006.01) |
| G06F 13/28 | (2006.01) |
| G06F 12/02 | (2006.01) |
| G06F 12/14 | (2006.01) |
| G06F 3/06 | (2006.01) |

(52) U.S. Cl.
CPC ........ *G06F 12/0246* (2013.01); *G06F 12/1408* (2013.01); *G06F 2212/2022* (2013.01); *G06F 3/061* (2013.01); *G06F 3/0638* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 6,145,069 | A  * | 11/2000 | Dye | 711/170 |
| 2006/0294059 | A1 * | 12/2006 | Chamberlain et al. | 707/3 |
| 2007/0055831 | A1 * | 3/2007 | Beeston et al. | 711/154 |
| 2007/0260602 | A1 * | 11/2007 | Taylor | 707/6 |
| 2008/0140932 | A1 * | 6/2008 | Flynn et al. | 711/114 |
| 2011/0314235 | A1 * | 12/2011 | Kwon et al. | 711/154 |
| 2012/0072683 | A1 * | 3/2012 | Iliadis | 711/159 |
| 2012/0117348 | A1 * | 5/2012 | Triantafillou et al. | 711/163 |
| 2013/0198445 | A1 | 8/2013 | Bando et al. | |
| 2013/0275692 | A1 * | 10/2013 | Kwok | 711/156 |
| 2014/0082459 | A1 | 3/2014 | Li et al. | |

OTHER PUBLICATIONS

U.S. Patent Application entitled "System and Method for Performing Efficient Searches and Queries in a Storage Node," U.S. Appl. No. 13/949,913, file history and Office actions, 182 pages.
Final Office action for U.S. Appl. No. 13/949,913, mailed Apr. 16, 2014, 16 pages.

\* cited by examiner

*Primary Examiner* — Yaima Rigol
(74) *Attorney, Agent, or Firm* — Christie, Parker & Hale, LLP (57) ABSTRACT

A system and method of providing enhanced data processing and analysis in a storage device, such as a solid state drive (SSD). The SSD includes flash memory and an SSD processing unit capable of executing searches on the data in the flash memory without returning all of the data to be searched to a host CPU outside of the SSD. Other processing capabilities incorporated into the SSD may include encryption and decryption, compression and decompression, and in-line indexing of data.

15 Claims, 7 Drawing Sheets

FIG. 1

RELATED ART

SYSTEM AND METHOD FOR PERFORMING EFFICIENT PROCESSING OF DATA STORED IN A STORAGE NODE

FIELD

The following description relates to cloud data storage systems and more particularly to a system and method for performing efficient processing of data stored in storage devices configured for cloud storage applications.

BACKGROUND

Every day, several quintillion bytes of data may be created around the world. This data comes from everywhere: posts to social media sites, digital pictures and videos, purchase transaction records, bank transactions, sensors used to gather data and intelligence, like climate information, cell phone GPS signal, and many others. This type of data and its vast accumulation is often referred to as "big data." This vast amount of data eventually is stored and maintained in storage nodes, such like hard disk drives (HDD), solid-state storage drives (SSD), and the like, and these may reside on networks or on storage accessible via the Internet, which may be referred to as the "cloud." This stored data may also require processing, or be subject to operations, such as during a search, query, encryption/decryption, compression, decompression, and other processes. Typically, a processing device, such as a central processing unit (CPU), in a server performs operations on the data. The data is read from the storage node, processed by the CPU and the processed data is sent to the source of a request and/or stored back on the storage node. Standard storage nodes generally do not include computational resources to perform such operations on data stored in the storage node.

Moreover, standard storage node interfaces, such as Serial Advanced Technology Attachment (SATA), Fibre Channel, and Serial Attached SCSI (SAS), do not define commands to trigger the storage node to perform data operations in the storage node. Accordingly, operations are performed outside of the storage node, e.g., in a server CPU. To perform such an operation, a server uses standard read and write commands supported by existing storage node interfaces to move data from and to the storage node. Specifically, the server sends a standard read command to the storage node via a bus. The storage node then sends the stored data over the bus to the server, which typically holds the data in its main memory. The CPU of the server then performs operations on the data to produce a result. Depending on the type of operation, the server provides the result to a requesting source and/or stores the result on the storage node.

There are several disadvantages associated with this process of reading the data from the storage node, and processing the data within the server, and potentially storing the processed data back on the storage node. Because of these disadvantages, the process of performing data operations on the server is referred to as "costly" or "expensive" in terms of device performance and power consumption. Because the server is involved in every step of the process, this process occupies the CPU of the server, consumes power, blocks other user operations that otherwise could have been performed, and requires that the server contain a buffer, or a larger buffer than would otherwise be needed. The buffer is typically the main memory of the CPU, or double data rate (DDR) random access memory. This process also ties up the communication bus between the server and the storage node since data is sent from the storage node to the server and then back to the storage node. In other words, existing processes for searching and analyzing large distributed unstructured databases are time-consuming and use large amounts of resources such as CPU utilization, memory footprint, and energy. Finally, these processes prevent the storage node management system from performing more sophisticated optimizations.

In summary, typical operations like search (query), decryption, and data analysis are, in existing systems, performed on the local server's CPU. Search and processing are performed over the entire data residing in storage nodes (e.g., solid state drives (SSDs), hard disk drives (HDDs), etc.) within the server. Data needs to be moved from the storage node into the CPU memory where it can then be processed. This is inefficient, e.g., slow, because a single server CPU, which may control a large collection of storage nodes, has relatively little processing power with which to process the large volume of data stored on the collection of storage nodes. Moreover, requiring the server's CPU to do this work makes inefficient use of energy as well, in part because a general-purpose CPU like a server CPU generally is not designed to perform operations such as searching efficiently, and in part because transferring data over a data bus and across the interface to the storage node requires a significant amount of power. Thus, there is a need for a system and method for more efficiently processing data stored on storage nodes.

SUMMARY

According to aspects of embodiments of the present invention, a system and method of providing enhanced data processing and analysis in a storage device, such as a solid state drive (SSD) is provided. In one embodiment, the SSD includes flash memory and an SSD processing unit capable of processing the data in the flash memory, or being stored or retrieved from the flash memory, without returning all of the data to be searched to a host CPU outside of the SSD. Processing capabilities incorporated into the SSD may include encryption and decryption, compression and decompression, and in-line indexing of data.

According to an embodiment of the present invention there is provided a solid state drive including: a host interface; a processing unit; and a flash memory; the processing unit being in communication with the host interface, and the flash memory, and including: a digital signal processing (DSP) core; and a microcontroller; the DSP configured to be controlled by the microcontroller, and: to process, using a processing algorithm, data received from the flash memory to form processed data.

In one embodiment, the processing algorithm includes a decompression algorithm to form decompressed data.

In one embodiment, the processing algorithm includes analysis of the decompressed data.

In one embodiment, the processing algorithm includes a decryption algorithm to form decrypted data.

In one embodiment, the processing algorithm includes analysis of the decrypted data.

In one embodiment, the processing algorithm includes an in-line indexing algorithm.

In one embodiment, the processing unit includes a buffer.

In one embodiment, the DSP core, the microcontroller, and the buffer are integrated on a single semiconductor chip.

In one embodiment, the semiconductor chip is a single silicon chip.

According to an embodiment of the present invention there is provided a method of storing data in, and retrieving data from, a solid state drive including a host interface and a flash memory, the method including: retrieving, by the solid state drive, data from the flash memory; processing, by the solid state drive, the retrieved data, using a processing algorithm, to generate processed data.

In one embodiment, the processing algorithm includes a decompression algorithm to form decompressed data.

In one embodiment, the processing algorithm includes analysis of the decompressed data.

In one embodiment, the processing algorithm includes a decryption algorithm to form decrypted data.

In one embodiment, the processing algorithm includes analysis of the decrypted data.

In one embodiment, the analysis includes a conditional search.

In one embodiment, the processing algorithm includes an in-line indexing algorithm.

According to an embodiment of the present invention there is provided a method for servicing queries using a solid state drive, the method including: receiving, at a server, a data to be stored; transmitting the data to the solid state drive, the solid state drive including a processing unit and a flash memory; processing, by the processing unit, the data, using a processing algorithm, to generate processed data; and storing, by the processing unit, the processed data in the flash memory.

In one embodiment, the processing algorithm includes a decompression algorithm.

In one embodiment, the processing algorithm includes a decryption algorithm.

In one embodiment, the processing algorithm includes an in-line indexing algorithm.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION

The detailed description set forth below in connection with the appended drawings is intended as a description of exemplary embodiments of a system and method for performing efficient data operations and analytics provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

The present disclosure relates to systems and methods for processing data in large systems using solid state storage. According to an embodiment of the present invention, processing of data stored on a solid state storage node, which may be referred to as a solid state drive (SSD) does not require comparatively slow reading and re-writing of the data and, instead, is accommodated by performing the processing within the SSD.

Conventional SSDs typically include a controller for facilitating the transfer of data to and from the SSD. The CPU in a typical SSD has limited processing capability, which is an obstacle to running an operating system and to running Java. It also lacks a hardware engine for performing a word count or pattern matching.

Figure 1:
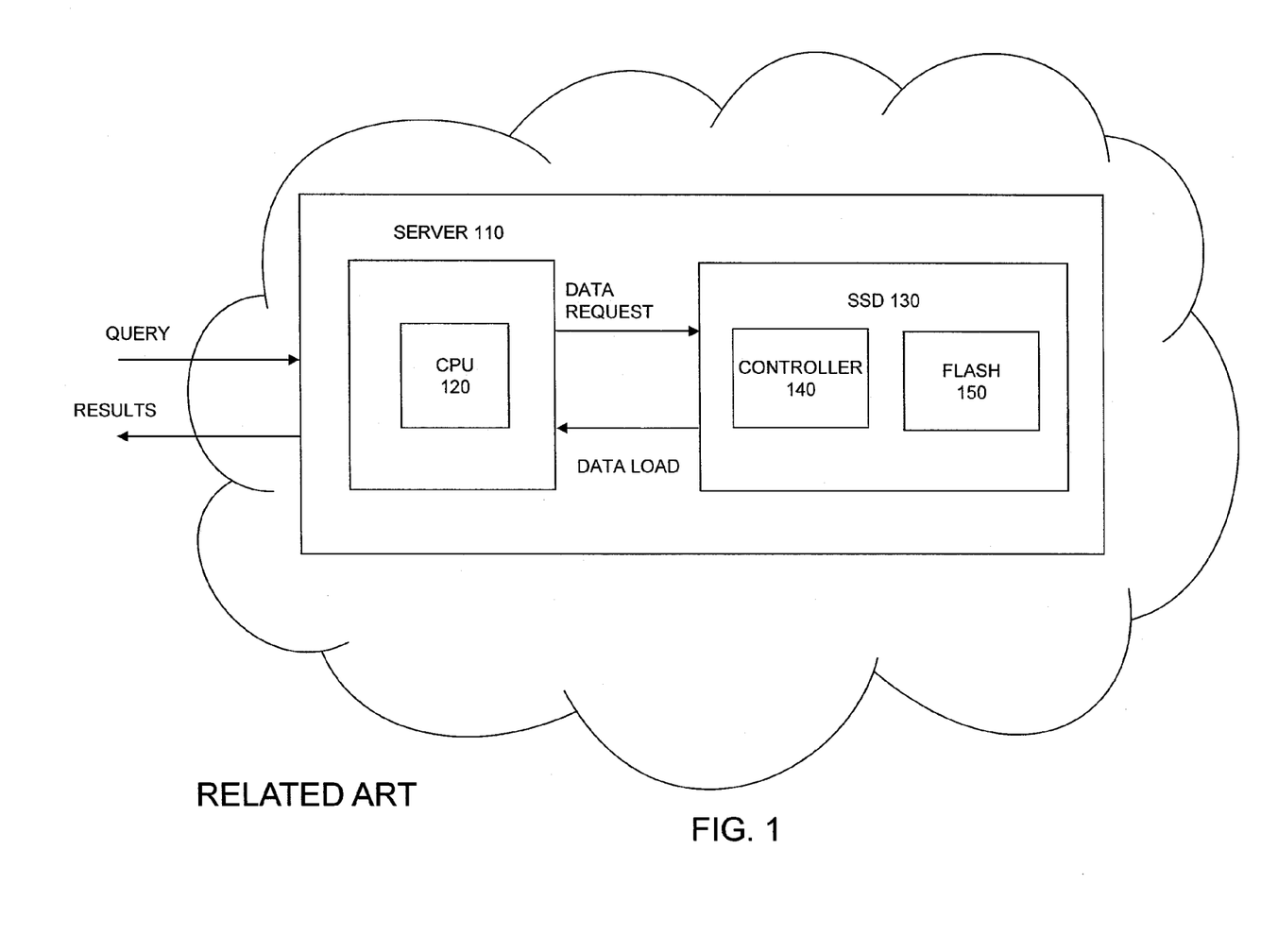
FIG. 1 shows an exemplary block diagram depicting a solid state drive in communication with a server, in accordance with related art systems.

FIG. 1 is a block diagram of a system which includes a server 110 in communication with a storage node for performing data queries according to prior art implementations. FIG. 1 includes a server 110, which can include a processor, such as a server central processing unit (CPU) 120, and an SSD 130, which can include a storage node controller 140 and a non-volatile memory, e.g., a flash memory 150. The server 110 and SSD 130 may be implemented in a cloud-based computing environment. The server 110 and SSD 130 may communicate using any storage buses as well as PCIe with any protocol which runs on it. In other embodiments storage nodes may be connected to, and controlled by, a host CPU which need not be a server CPU but may be a CPU in an application not configured as a server. Thus a server CPU may be an example of a host CPU.

As used herein, the phrase "in communication with" refers to direct communication with or in indirect communication with via one or more components named or unnamed herein. The server 110 and the SSD 130 can be in communication with each other via a wired or wireless connection. For example, in one embodiment, the SSD 130 may comprise pins (or a socket) to mate with a corresponding socket (or pins) on the server 110 to establish an electrical and physical connection. In another embodiment, the SSD 130 can comprise a wireless transceiver to place the server 110 and the SSD 130 in wireless communication with each other. The server 110 and the SSD 130 may be separately housed from each other, or contained in the same housing.

As shown in FIG. 1, in operation, the server 110 may receive a query, which may, for example, entail finding the number of occurrences of a certain pattern or text. As used herein, a pattern is a combination of strings and logical operations, in which the logical operations determine which combinations of the strings, if they are found in a set of data, will constitute a match for the pattern in the set of data. In response, the server 110 may send a data request to the SSD 130. The SSD 130 receives the data request, and retrieves the requested data. The SSD 130 then sends the data to the server 110. The server CPU 120 processes the data and returns the results. The server 110 and the SSD 130 may include additional components, which are not shown in FIG. 1 to simplify the drawing.

Figure 2:
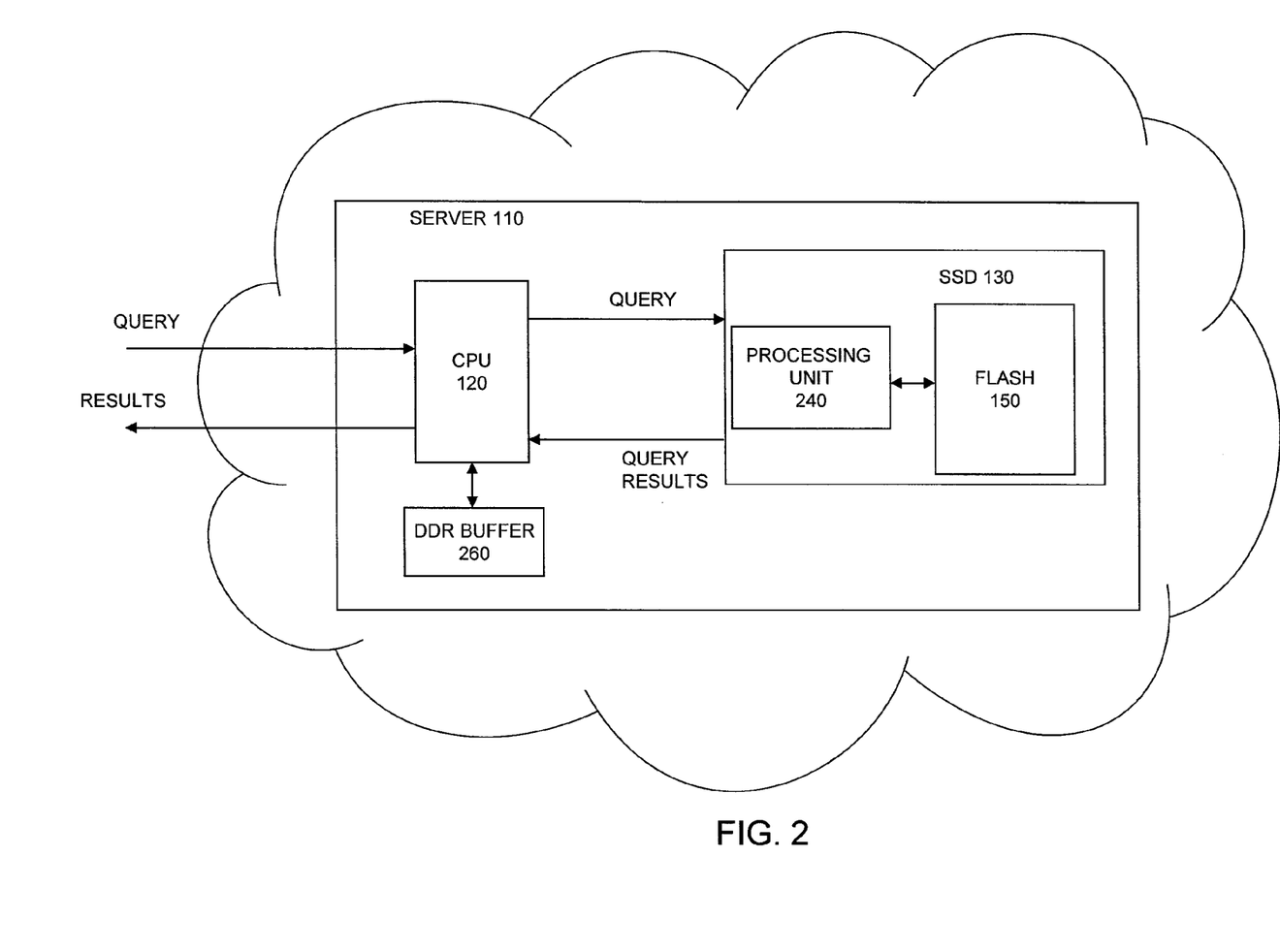
FIG. 2 depicts an exemplary block diagram of a solid state drive in communication with a server, in accordance with an embodiment of the present disclosure.

FIG. 2 is a block diagram of a system which includes a server 110 containing, and in communication with, an SSD 130 for performing data queries according to aspects of the present disclosure. The server 110 and SSD 130 may be part of a cloud-based computing environment, a network, or a separate subsystem. The server may also contain a server CPU 120, and a DDR buffer 260, which may be composed of DDR memory.

According to aspects of the present disclosure, the SSD 130 includes an SSD processing unit 240 that is designed for data operations or analytics, such as search and analysis of a large volume of unstructured data. The SSD processing unit 240 can include, for example, a reconfigurable digital signal processing (DSP) core containing arithmetic and logic units and other dedicated hardware units that may be used to perform data analytics, and other operations such as compression, decompression, encryption, and decryption. In one embodiment, the SSD 130 includes an ARM-based core or any other CPU. These additional cores and circuitry within the silicon of the SSD processing unit 240 occupy a small area and as a result consume little power. Although these functions could also be performed on a server CPU, such a CPU, being a general purpose CPU, will generally consume significantly more power. Moreover, transferring data over a data bus and across the interface to the storage node requires a significant amount of power. By designing and/or integrating the silicon of the SSD processing unit 240 to perform the desired functions, their execution can be made significantly more power-efficient. The SSD 130 may include an SSD processing unit 240 and a flash memory 150.

In one embodiment, the SSD processing unit 240 performs querying of data. For example, a query may consist of a request to find a text word, and/or the number of occurrences of that text word in the storage nodes in the server. According to aspects of the present disclosure, instead of reading the entire contents of the storage node into the server CPU and counting the number of matches, the task can be computed locally within the storage node. The server 110 may be configured to receive queries. When the server (also referred to as the data node) receives a query, the server passes the query to the storage nodes in the server. Each of these storage nodes, which may be SSDs, may then process the query and return the results to the server, which may compile them. While this process is illustrated with reference to a query, a similar process enables data analytics, decryption, and other such operations to be performed on the SSD processing unit 240.

A query may include pattern matching, word count or occurrence counting. In both pattern matching and occurrence counting the data are searched for matches to one or more specified patterns; in pattern matching, the matching data are returned whereas in occurrence counting only the number of matches is returned. In addition to pattern matching, word count, and occurrence count, the SSD processing unit 240 may run a Java engine. The ability to run a Java engine on the SSD processing unit 240 may enable the SSD processing unit to perform sophisticated analyses of historical data, and also to run advanced algorithms for predictive analysis. It may also enable the storage node to perform more complex operations in response to communications supported by standard storage node interfaces. The ability to run Java requires a high performance CPU and also requires an operating system. The unused portion of the SSD processing unit 240 may be used for running the operating system and Java for high level operation. Other operations, such as counting the number of occurrences of a string in the SSD data, for which high speed execution at low power consumption is important, may be performed by purpose-designed processing elements or by a DSP core in the SSD processing unit 240.

Figure 3:
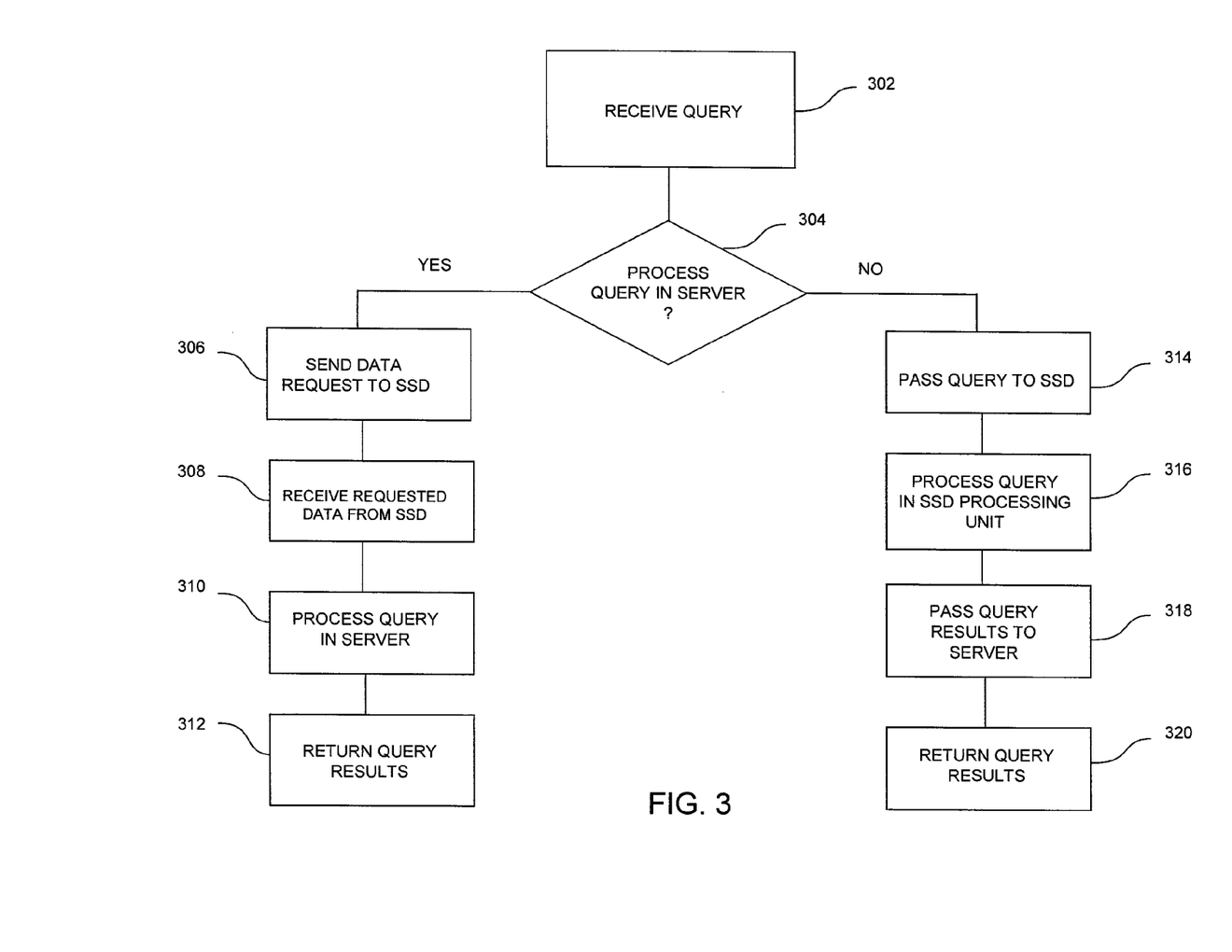
FIG. 3 shows exemplary acts for performing queries in a solid state drive, in accordance with an embodiment of the present disclosure.

FIG. 3 illustrates a flow diagram of an exemplary method for performing data queries according to aspects of the present disclosure. Specifically, the system of FIG. 2 receives a query 302 for data. At act 304, the server determines whether the query will be processed in the server or whether it will be passed to the SSD. If the system performs the query in the server, then at act 306, the server sends a data request to the SSD. The server receives the requested data from the SSD at act 308 and processes the query in the server at act 310. Finally, the server returns the query results at act 312.

If the system performs the query in the SSD, then at act 314, the server passes the query to the SSD. The SSD processes the query at act 316 and passes the query results to the server at act 318. Finally, the server returns the query results at act 320. While this process is illustrated with reference to a query, a similar process enables data analytics, decryption, pattern matching and searching, and other such operations to be performed on the SSD processing unit 240.

Figure 4:
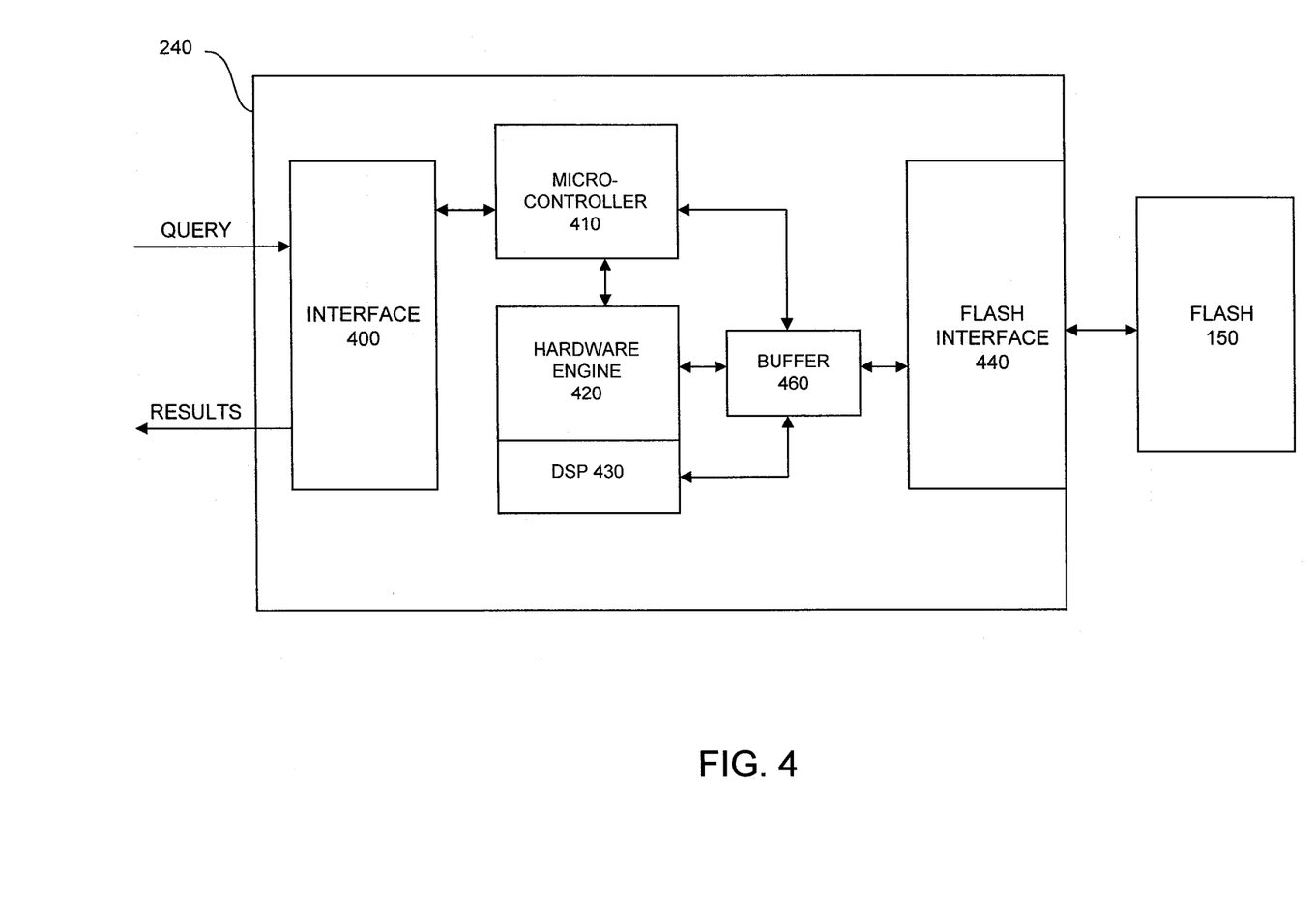
FIG. 4 depicts an exemplary block diagram of a processing unit of a solid state drive in communication with a server and flash memory storage, in accordance with an embodiment of the present disclosure.

FIG. 4 is a block diagram of an SSD processing unit 240 according to an embodiment of the present invention. The SSD processing unit 240 includes a host interface 400, a microcontroller 410, a hardware engine 420, a digital signal processor (DSP) or DSP core 430, a processing unit buffer 460, and a flash interface 440. The host interface 400 may be, for example, PCIe, NVMe, SATA, Fibre Channel, SAS, SCSI over PCIe, or Ethernet. There may be other components on the SSD processing unit 240 which are not illustrated, such as buffers and the like. The SSD processing unit 240 communicates with the flash memory 150 through the flash interface 440, which may implement a flash channel interface. In one embodiment, there may be a separate hardware engine 420 for each flash channel; the hardware engine 420 may include a hardware-based search engine. As used herein, a search engine is a digital hardware block designed to test a set of data to determine whether and where it contains matches to a specified pattern. Thus, a comparator implemented in hardware is an example of a search engine, and a more complex search engine may include, among its functional elements, a comparator implemented in hardware. The SSD processing unit 240 may be a single silicon chip, e.g., a system on a chip (SOC). In one embodiment, the DSP core is a reconfigurable DSP. In one embodiment, the microcontroller 410, the processing unit buffer 460, and the flash interface 440 are all integrated onto a single semiconductor chip (e.g., a single silicon chip), along with a hardware engine 420 or a DSP core 430, or both.

As shown in FIG. 4, the SSD processing unit 240 may receive a query through the host interface 400. In one embodiment, the microcontroller 410 processes the query by using the hardware engine 420 to compare the requested content of the query with the data on the flash memory 150. The hardware engine 420 may be a hardware-based search engine and may work in conjunction with the DSP 430. In one example the DSP may perform encryption and decryption and the hardware engine may perform searching. The microcontroller 410 returns the results of the query to the server 110 through the host interface 400. In other embodiments, the results of the query or other operation in the SSD 130 may, instead of being returned to the server CPU 120 or host CPU, be stored in the flash memory 150 or flash memories 150 (FIG. 7), for subsequent retrieval by the server CPU or host CPU.

Figure 5:
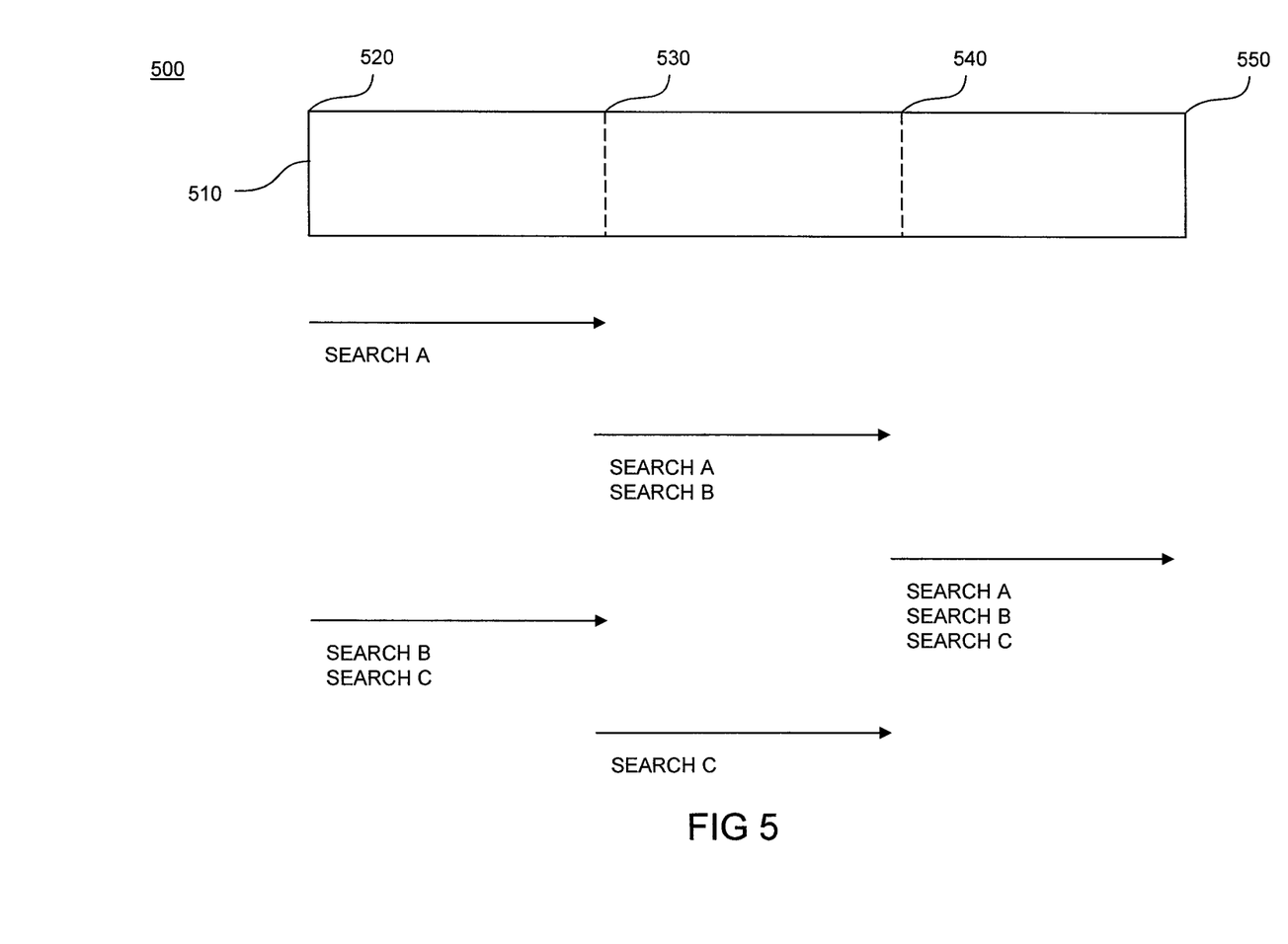
FIG. 5 shows a representation of the storage area of a solid state drive, in relation with searches conducted on the storage area, in accordance with an embodiment of the present disclosure.

FIG. 5 shows a representation of the storage area of an SSD 130, in relation with search processes conducted on the storage area, in accordance with an embodiment of the present disclosure. FIG. 5 includes a data storage area 510, which reflects the storage area on the flash memory 150 where data may be located. The server 110 may send queries regularly based on requests it may receive. Once a query, e.g., a request to search for occurrences of a first pattern, is passed to the SSD 130, the SSD 130 begins processing it, searching the flash memory 150. If an additional query, related to a second pattern, arrives before the SSD 130 has completed processing of the initial query, the SSD 130 may continue to search for the first pattern while simultaneously or concurrently beginning to search for the second pattern. Once it reaches the end of the flash memory 150, the SSD may then start again at the beginning of the flash memory 150, searching for only the second pattern, until it reaches the point in the flash memory 150 at which it received the second query.

A wide range of capabilities may be implemented in a system constructed according to the embodiment illustrated in FIG. 4. For example, if the hardware engine 420 includes a hardware-based search engine, the system may be capable of high-speed, power-efficient searches of the flash memory 150, for example to count the number of occurrences of a string, pattern, or number. The DSP 430 may be used for functions such as encryption of the data written to the flash memory 150 and decryption of the data read from the flash memory 150, or similarly for compression and decompression at write and read respectively, to increase the effective storage capacity of the SSD 130. In one embodiment an application layer, running for example in the server CPU 120, may perform encryption or compression, and the DSP 430 may decrypt or decompress the data as needed based on the algorithm used in the application layer. The algorithm used by the application layer may be communicated to the DSP by the host CPU. A DSP may also be used for other functions such as in-line indexing, which may be performed when data is written to the flash memory 150, producing an index which may subsequently be used to accelerate search operations of the flash memory 150.

In one embodiment, the SSD 130 may perform sophisticated analysis including searches and conditional searches. For example a server may have stored in it a very large number of email messages, and a user may wish to find messages satisfying certain criteria, having been sent by a particular sender to any recipient at a particular company. The combination of these two criteria may be tested for by a suitably selected pattern, but if the user wishes to narrow the search further, e.g., with an intelligent search of the body of each email to determine whether a particular transaction was discussed, a more sophisticated algorithm than pattern matching may be required. A conditional search may be used in this example, where criteria related to the body of an email are tested only if an email first meets a first set of criteria, e.g., related to the header of the email; in this case, additional criteria, e.g., a second or third set of criteria related to the body of the email may be added to the search. A system constructed according to the embodiment illustrated in FIG. 4 is suitable for implementing a broad class of analysis algorithms including searches and conditional searches.

In another example as illustrated in FIG. 5, upon receipt of query requiring a first search, referred to as Search A, the process begins reading the data storage area 510 at a storage location 520 and progresses through the data storage area 510. During Search A, while at a storage location 530, a query requiring a second search, referred to as Search B, is received, and the process begins Search B at storage location 530, in addition to continuing Search A at storage location 530. Similarly, Search C is added to the set of simultaneously conducted searches at storage location 540. Search A completes at storage location 550, while Search B and Search C continue at storage location 520. Search B then completes at storage location 530, and Search C completes at storage location 540.

As illustrated in FIG. 5, the search process continues previously initiated searches across the data storage area 510, while simultaneously commencing newly requested searches. The data storage area 510 may be comprised of logical or physical addresses. The addresses may be defined as blocks, pages, sectors, or the like.

Figure 6:
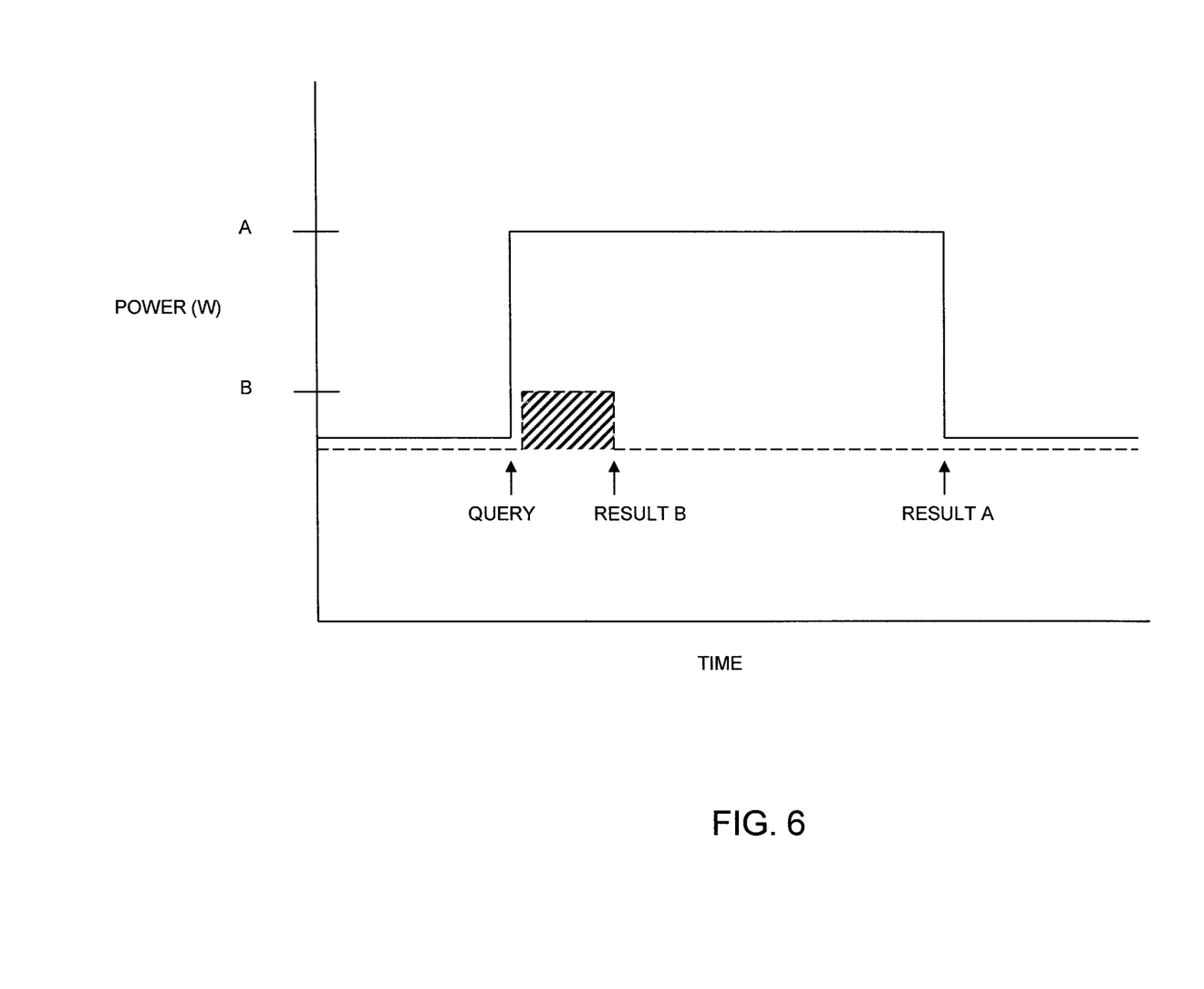
FIG. 6 shows a chart comparing the power usage of an existing system with the power usage of a system employing a storage node constructed according to an embodiment of the present invention, during an exemplary query of a solid state drive.

FIG. 6 shows a chart of the power usage of existing systems in relation to the power usage of a system constructed according to an embodiment of the present invention, for an exemplary query of a solid state drive. The solid line depicts typical power usage when a server processes a query. The dotted line depicts typical power usage when the query is instead performed by the solid state drive 130. Because the server CPU both consumes a higher level of power (level A in FIG. 6) and spends more time processing the query, the energy consumed, i.e., the area under the solid line, is significantly greater than the energy consumed (represented by the cross-hatched area under the dashed line) when the query is processed by the SSD 130, which consumes power at a lower level (level B in FIG. 6) and completes the processing more quickly.

Figure 7:
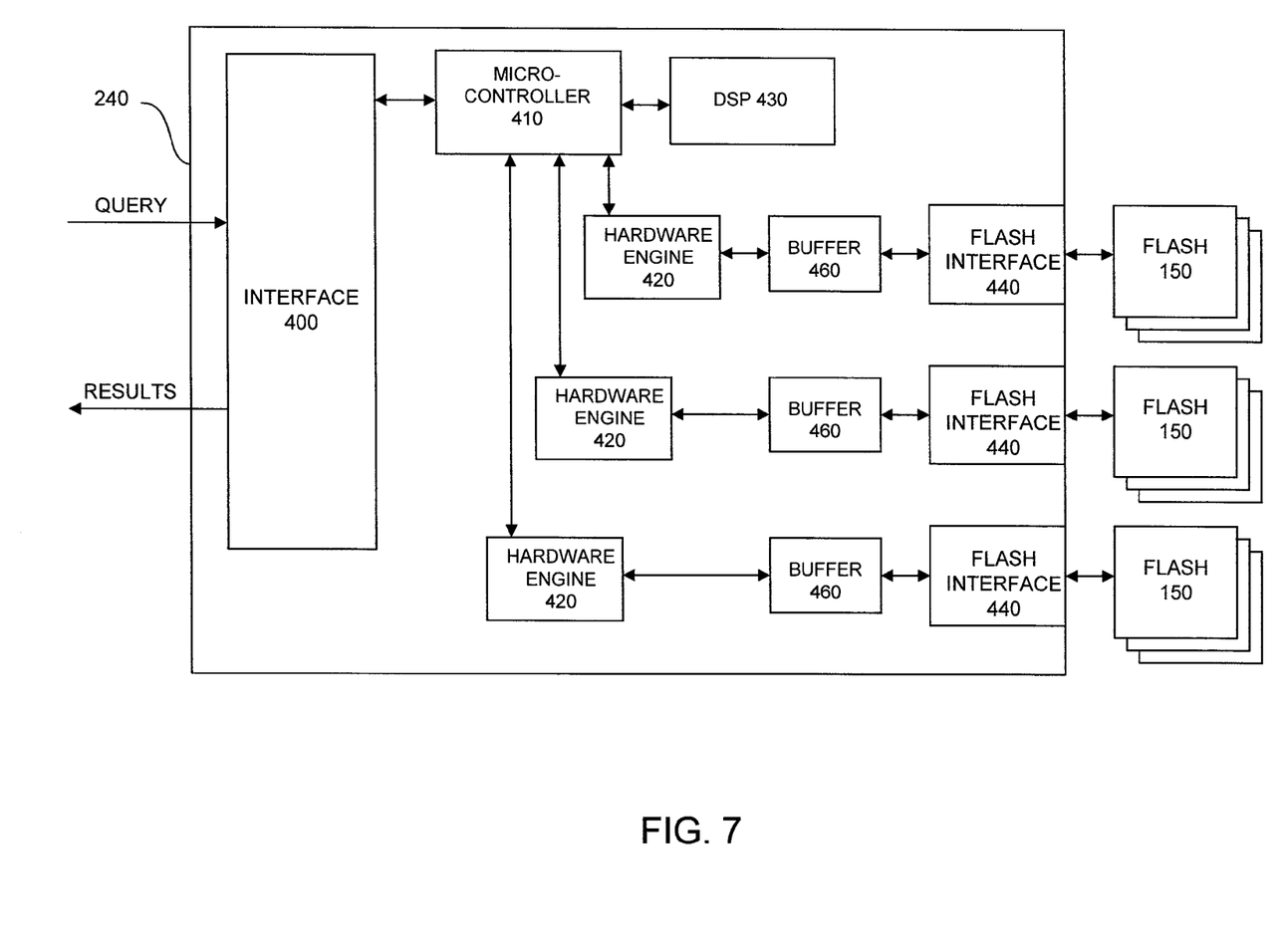
FIG. 7 depicts an exemplary block diagram of a processing unit of a solid state drive in communication with a server and a plurality of flash memories, in accordance with an embodiment of the present disclosure.

Referring to FIG. 7, in one embodiment of an SSD processing unit 240, the microcontroller 410 may be connected to a plurality of hardware engines 420, each of which may access a plurality of flash memories 150 through a buffer 460 and a flash interface 440. This structure allows searches to be performed in parallel, resulting in shorter processing times (as illustrated in FIG. 6).

Applications

The disclosed systems and methods have many potential applications, including but not limited to data queries, data analytics, encryption and decryption. While the illustrations above relate to a query, a similar process may be performed, for example, in relation to data analytics, compression and decompression, and encryption and decryption.

There are many alternatives that can be used with these embodiments. For example, while solid state drives (SSDs) were discussed in examples above, any type of suitable memory device, such as a hard disk drive (HDD), can be used. Further, embodiments of the present invention may be used in a redundant array of independent disks (RAID) to achieve similar advantages in optimizing performance and resource utilization, while taking advantage of efficiencies in RAID parity calculations and the number of physical inputs and outputs (I/Os) performed. Accordingly, these embodiments can be used to make RAID controllers and subsystems more efficient.

Other embodiments are within the scope and spirit of the invention. For example, the functionality described above can be implemented using software, hardware, firmware, hard-wiring, or combinations of any of these. One or more computer processors operating in accordance with instructions may implement the functions associated with managing use of cache devices in accordance with the present disclosure as described above. If such is the case, it is within the scope of the present disclosure that such instructions may be stored on one or more non-transitory processor readable storage media (e.g., a magnetic disk, non-volatile random-access memory, phase-change memory or other storage medium). Additionally, modules implementing functions may also be physically located at various positions, including being distributed such that portions of functions are implemented at different physical locations.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein and equivalents thereof.

What is claimed is:

1. A solid state drive comprising:
a host interface;
a processing unit; and
a flash memory;
the processing unit being in communication with the host interface, and the flash memory, and comprising:
a digital signal processing (DSP) core; and
a microcontroller;
the DSP configured to be controlled by the microcontroller, and:
to process, using a processing algorithm, data received from the flash memory to form processed data,
the processing unit configured to execute a search analysis on the processed data, the processed data comprising unstructured data, the search analysis comprising an analysis selected from the group consisting of:
comparing the processed data to a specified pattern, wherein the comparing comprises first testing the processed data with a first set of criteria, and second testing the processed data with a second set of criteria in response to the first testing only when the processed data meet the first set of criteria,
counting words in the processed data, wherein the counting comprises counting the number of occurrences of a word in the processed data,
performing in-line indexing of the processed data,
and combinations thereof,
wherein the search analysis comprises the comparing of the processed data to the specified pattern, wherein the comparing comprises the first testing of the processed data with the first set of criteria, and the second testing of the processed data with the second set of criteria in response to the first testing only when the processed data meet the first set of criteria,
wherein the unstructured data comprises a header and a body,
wherein the first testing comprises first testing the header with the first set of criteria, and the second testing comprises second testing the body with the second set of criteria in response to the first testing only when the header meets the first set of criteria.

2. The drive of claim 1, wherein the processing algorithm comprises a decompression algorithm to form decompressed data.

3. The drive of claim 2, wherein the processing algorithm comprises analysis of the decompressed data.

4. The drive of claim 1, wherein the processing algorithm comprises a decryption algorithm to form decrypted data.

5. The drive of claim 4, wherein the processing algorithm comprises analysis of the decrypted data.

6. The drive of claim 1, wherein the processing unit comprises a buffer.

7. The drive of claim 6, wherein the DSP core, the microcontroller, and the buffer are integrated on a single semiconductor chip.

8. The drive of claim 7, wherein the semiconductor chip is a single silicon chip.

9. A method of storing data in, and retrieving data from, a solid state drive comprising a host interface and a flash memory, the method comprising:
retrieving, by the solid state drive, data from the flash memory;
processing, by the solid state drive, the retrieved data, using a processing algorithm, to generate processed data, the processed data being unstructured data,
the processing algorithm comprising a first search analysis, the first search analysis comprising comparing the unstructured data to a specified pattern,
wherein the processing algorithm further comprises a second search analysis executed concurrently with the first search analysis, the second search analysis comprising comparing the unstructured data to a specified pattern,
wherein the first search analysis is on a header of the processed data, and the second search analysis is on a body of the processed data.

10. The method of claim 9, wherein the processing algorithm further comprises a decompression algorithm to form decompressed data.

11. The method of claim 10, wherein the processing algorithm further comprises analysis of the decompressed data.

12. The method of claim 9, wherein the processing algorithm further comprises a decryption algorithm to form decrypted data.

13. The method of claim 12, wherein the processing algorithm further comprises analysis of the decrypted data.

14. The method of claim 13, wherein the analysis comprises a conditional search.

15. The method of claim 9, wherein the processing algorithm further comprises an in-line indexing algorithm.

* * * * *